United States Patent
Goetz

[15] 3,668,189
[45] June 6, 1972

[54] FLUORESCENT POLYCARBONAMIDES

[72] Inventor: Frederick J. Goetz, Cedar Knolls, N.J.

[73] Assignee: Allied Chemical Corporation, New York, N.Y.

[22] Filed: Aug. 24, 1970

[21] Appl. No.: 66,603

[52] U.S. Cl. .................................260/78 R, 260/31.2 R
[51] Int. Cl. ..............................................C08g 20/20
[58] Field of Search ........................................260/78 R

[56] References Cited

UNITED STATES PATENTS 3,301,827   1/1967   Martin ..............................260/78 R
3,542,734   11/1970  Rippie ..............................260/78 R Primary Examiner—Harold D. Anderson
Attorney—Arthur J. Plantamura and Herbert G. Burkard

[57] ABSTRACT

Nylons are conventionally prepared by the condensation polymerization of diamines with dibasic acids. If there is incorporated into the polymerization charge from about 0.1 to 100 moles per 10,000 moles of conventional dibasic acid; a diacid, diester, diamide diacid chloride or diamidediamine of a fused-ring, polynuclear aromatic hydrocarbon having at least three fused rings, the thereby resulting nylon is fluorescent.

4 Claims, No Drawings

FLUORESCENT POLYCARBONAMIDES

BACKGROUND OF THE INVENTION

This invention relates to fluorescent nylons. Linear polyamides are generally formed by either the self-condensation polymerization of amino acids or by the condensation of diamines with dibasic acids or with an amide forming derivative of such diacids. Linear polyamides of both types are generally referred to as nylons. This invention is concerned with nylons prepared by the condensation of diamines with dibasic acids or with amide forming derivatives of said dibasic acids. Such nylons can be represented by the structural formula:

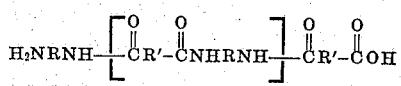

wherein R and R' represent that portion of the diamine or diacid molecule, respectively, to which the two amine or two carboxylic acid moieties are appended. While such portions, i.e. bridging groups, of the molecule can be a linear or branched chain aliphatic, alicyclic or aromatic hydrocarbon or may even contain hetero atoms, as a practical matter the commercially useful nylons utilize either a linear aliphatic or alicyclic hydrocarbon or a benzene ring as bridging groups. The commonly used descriptive nomenclature for such nylons utilizes two numbers. The first number connotes the number of carbon atoms separating the nitrogen atoms of the diamine, the second connotes the number of straight-chain carbon atoms in the dibasic acid. For example, nylon 6,6 is derived from hexamethylene diamine and adipic acid. The only widely used nylons not prepared from linear aliphatic dibasic acids are the so-called aromatic nylons which use iso- or terephthalic acid and thus have a benzene ring as a bridging group. In such cases, the letter "I" or "T" is conventionally used in place of the second number.

Such dibasic acids are hereinafter referred to as conventional dibasic acids. Examples of such conventional dibasic acids include terephthalic, the various naphthalene dicarboxylic acids, p p'biphenyl dicarboxylic acid, oxalic, malonic, succinic, glutaric, adipic, pimelic, suberic, azelaic sebacic, and nonane and decane dicarboxylic acid.

Suitable diamines include the $C_2$ to $C_{12}$ polymethylene diamines, i.e. ethylene diamine to dodecamethylene diamine, $C_2$ to $C_{24}$ alicyclic diamines, and m- and p-phenylene diamine.

The term alicyclic diamines as used herein encompasses both mono and polycyclic compounds such as hydrogenated methylene dianiline, hydrogenated isopropylene dianiline and p,p'bis [2(p-aminophenyl)propyl]benzene.

In preparing such polyamides, either melt, emulsion, i.e. interfacial, or solution polymerization techniques may be utilized.

In melt polymerization, molten diamine and dicarboxylic acid are reacted together, accompanied by the elimination of water. For example, in preparing nylon 6,6:

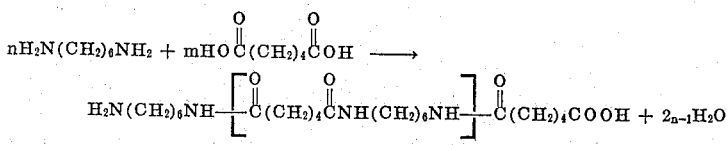

Amide or phenyl or alkyl ester derivatives of the dibasic acid moiety can also be utilized. In such cases, the amine moiety of the diamine replaces the amine, phenol or alcohol portion of the original amide or ester which amine, phenol or alcohol is eliminated instead of water.

In solution polymerization, a diamine and a diacid chloride are reacted together dissolved in an inert organic solvent in the presence of an organic base acid acceptor such as a tertiary amine. For example:

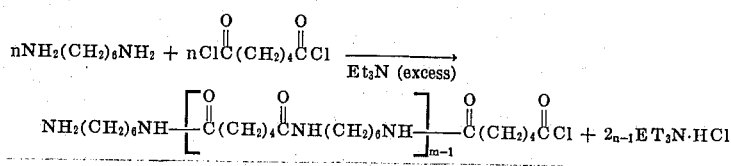

Emulsion, i.e. interfacial, polymerization is generally carried out at low temperature and involves adding the diacid chloride in a water-immiscible solvent to an aqueous solution of diamine, inorganic base and a surfactant. Polymerization takes place in the organic layer at the phase interface. The inorganic base reacts with the HCl evolved in the reaction in analogous fashion to the tertiary amine in the fully nonaqueous system.

My invention relates to modified nylon and to a process for producing it. More particularly, my invention relates to fluorescent nylon. The phenomenon of fluorescence connotes the production of visible light by a substance as the result of exposure to and absorption of electromagnetic radiation of a different wavelength. As used in the instant application, the term fluorescence is restricted to the emission of visible light on exposure to ultraviolet or near-ultraviolet visible light. Since daylight and virtually all artificial light contains substantial ultraviolet radiation, a fabric having the property of fluorescence will shimmer or glow on exposure to such daylight or artificial light. Such an effect is extremely striking in clothes or upholstery or in other decorator applications.

The prior art contains much teaching of ways to produce fluorescent fabrics. As is obvious, a fabric would be fluorescent when the fiber from which it is woven is fluorescent. The prior art has prepared fluorescent fabrics by physically incorporating fluorescent compounds into a fiber forming polymer and then preparing fiber and ultimately fabric from the polymer-fluorescent compound blend. This is analogous to the production of colored fabric by the incorporation of pigments into polymers which polymers are then formed into fibers and the fibers into fabric. This method of achieving fluorescence has numerous shortcomings. The fluorescence-imparting compounds are invariably expensive, large amounts must be incorporated, such incorporation is frequently difficult to achieve, and also, the fluorescent compounds are frequently leached out or partly decomposed during subsequent processing of the polymer/fluorscent compound blend. Additionally, such pigments can adversely affect the thermal and/or oxidative stability of the polymer into which they are incorporated.

SUMMARY OF THE INVENTION

It is an object of this invention to provide a modified nylon polymer which polymer, itself, inherently possesses the property of fluorescence.

As heretofore indicated, nylons are conventionally formed by the reaction of a diamine with a dicarboxylic acid or an amide forming reactive derivative of such acid.

It has now been found in accordance with the instant invention that if a very small percentage of the conventional diacid or derivative thereof which is utilized in the nylon forming polymerization mixture is replaced by the diacid, or amide forming derivative thereof of a fused ring, polynuclear aromatic hydrocarbon having at least three fused rings, the thereby resulting nylon is inherently fluorescent.

Specifically, I have found that if from 0.1 to 100 moles of a fused ring polynuclear aromatic hydrocarbon diacid having at least three fused rings are substituted for conventional diacid per 10,000 moles of said conventional diacid, the nylon produced from said acid mixture is fluorescent.

As hereinafter used, the term diacid or dibasic acid connotes either a dicarboxylic acid or a diacid chloride, diester or diamide derivative thereof which will react with diamines to form a polyamide since either diacids or derivatives thereof which will react with diamines to form polyamides can be utilized to prepare the polyamides of the instant invention.

Diacids of the following fused ring polynuclear aromatic compounds are suitable: anthracene, benzanthracene, benzopyrene, benzoperylene, chrysene, coronene, dibenzanthracene, perylene, benzo[c]phenanthrene, picene, pyrene and tetracene. The location of the carboxyl moieties on the fused rings is not critical, i.e. they can be adjacent or nonadjacent on the same ring or on different rings.

Suitable diacids include for example anthracene 1,5 and 1,8 dicarboxylic acid, perylene 3,9 and 3,10 dicarboxylic acid and 1:2, 3:4 dibenzanthracene-9,10-dicarboxylic acid.

The polynuclear aromatic diacids of the instant invention can be represented by the generic formula:

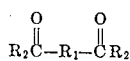

wherein $R_1$ connotes a fused ring polynuclear aromatic moiety having at least three fused rings, and $R_2$ connotes Cl, $OR_3$ or $NHR_3$ wherein $R_3$ is hydrogen or an alkyl, alicyclic or aromatic hydrocarbon of up to 12 carbons. If $R_3$ contains more than 12 carbons it is insufficiently volatile to be removed in the course of the polyamide formation and hence the polyamide formation reaction will generally not go to completion.

We have found that the polynuclear aromatic diacids utilized to prepare the fluorescent nylons of the instant invention react in such a fashion that both carboxyl moieties thereof react with diamine to afford some of the amide units of the polyamide chain.

Such polyamide unit formation can be schematically represented as follows using hexamethylene diamine as the diamine:

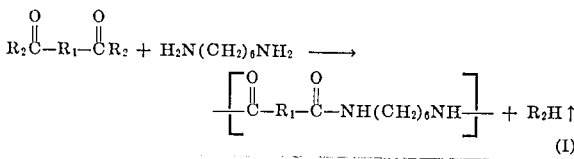

In the course of reaction $R_2H$ is ordinarily removed continuously to drive the polymerization to completion.

In the polyamides of the instant invention, each polyamide chain will ordinarily on the average have present amide units formed from the polynuclear fused ring aromatic diacid as shown in (I) and also units from the convention diacid such as adipic, phthalic and the like as hereinabove enumerated. The ratio of amide units formed from said polynuclear aromatic diacid to conventional diacid derived amide units in any given polyamide chain will ordinarily be dependent upon the mole ratio of polynuclear aromatic diacid to conventional diacid in the polymerization charge. As heretofore indicated, the mole ratio of polynuclear aromatic diacid to conventional dibasic acid can suitably vary from about 0.1 to about 100 moles per 10,000 moles. The ratio of polynuclear aromatic diacid to conventional dibasic acid derived amide units in any given polyamide chain can of course be higher or lower than the exact ratio of diacids in the polymerization charge. If the ratio of polynuclear aromatic diacid to conventional dibasic acid is exceptionally low, it is possible that some polyamide chains will contain no polynuclear aromatic diacid derived amide units. However, on the average, each polyamide chain will contain the same ratio of polynuclear aromatic diacid to conventional dibasic acid derived polyamide units as is present in the polymerization charge.

As an alternative to reacting polynuclear aromatic diacid directly with diamine simultaneously with reacting conventional diacid with diamine, the polynuclear aromatic diacid can be incorporated into the polyamide chain in a two-step process. That is, each mole of polynuclear aromatic diacid can be reacted with two moles of the diamine of choice to form a molecule of the following structure (using hexamethylene diamine as an example):

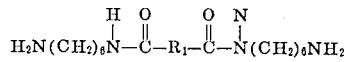

This diamide-diamine will than react further, along with unreacted diamine, with conventional diacid to form the desired polyamide containing polynuclear aromatic diacid moieties. This procedure is actually preferred since the diamide-diamine has essentially the same reactivity as the diamine from which it is prepared thereby helping to ensure substantially homogeneous distribution of the polynuclear aromatic diacid moieties throughout the polyamide polymer chains.

The manner in which the polynuclear aromatic diacid is incorporated into the polyamide polymer chains is not critical, i.e., either by direct reaction of polynuclear aromatic diacid plus conventional diacid with diamine or by reaction of conventional diacid with diamine and polynuclear aromatic diacid derived diamide-diamine as hereinbefore described. The only requirement is that from 0.1 to 100 polynuclear aromatic diacid derived units be present in the polyamide polymer chains per 10,000 conventional diacid derived units.

It should also be noted that any desired mixture of diamines or of conventional dibasic acid or of polynuclear aromatic dibasic acid can be utilized. The only critical factor is ensuring that there be present the above indicated ratio of polynuclear aromatic dibasic acid derived units to conventional dibasic acid derived units in the polyamide chains.

The fluorescent nylons of the instant invention can be prepared by any of the conventional hereinbefore enumerated nylon synthesis methods, i.e., emulsion, solution or melt polymerization. As in conventional nylons, ordinarily, approximately stoichiometric amounts of diamine are reacted with diacid.

Emulsion, solution, or melt polymerization techniques are suitable regardless of whether the polynuclear aromatic diacid is reacted directly with diamine along with conventional diacid or is first transformed into the diamide-diamine which is then reacted with diamine plus conventional diacid. In this latter case, the moles of conventional diacid present should preferably be essentially equivalent to the number of moles of diamine plus diamide-diamine.

Likewise, the particular conventional diacid or diamine which are utilized to prepare the fluorescent nylon of the instant invention is not critical. Any dibasic acid and diamine which are used in the art to prepare a polyamide (nylon) is suitable. The fluorescent nylon, so prepared, will be essentially identical in all nonoptical properties to the nylon prepared from the same conventional dibasic acid and diamine without the inclusion of polynuclear aromatic dibasic acid. The fluorescent nylons of the instant invention are, of course, fully processable by conventional nylon processing procedures.

The invention can be more fully understood by reference to the following examples. All parts are parts by weight unless otherwise expressly noted.

EXAMPLE 1

A solution of 3.0 ml sebacoyl chloride and 10 mg perylene-3,9-dicarbonyl chloride in 100 ml dry o-dichlorobenzene is carefully covered with a solution of 4.4 g 1,6-hexanediamine in 50 ml water. The film which formed at the interface was pulled slowly from the mixture. This film when worked with dilute sodium carbonate and dried yielded highly green fluorescent fiber on fusing and drawing.

EXAMPLE 2

Crude N,N'-bis(6-amino-1-hexyl)-perylene-3,9-dicarboxamide was prepared by addition of a solution of 50 mg perylene-3,9-dicarbonyl chloride in 25 ml warm, dry o-dichlorobenzene to a solution of 5 g 1,6-hexane diamine in 100 ml dry d-dichlorobenzene. The greater part of the solvent was removed in vacuo and the diamide precipitated with hexane, treated with dilute sodium hydroxide and washed with warm water. The dry diamide-diamine was employed instead of perylene3,9-dicarbonyl chloride following the procedure of Example 1. Intensely fluorescent fibers were again obtained.

EXAMPLE 3

To 20 g of hexanethylenediamine-adipic acid salt (pH of 1 percent aqueous solution was 7.5) in a polymer tube was added 10 mg N,N'-bis(6-amino-2-hexyl)-3,9-perylenedicarboxamide prepared as in Example 2. The contents of the tube were carefully purged with nitrogen so as to replace all air therein with nitrogen. The tube was then evacuated and sealed. The contents were heated to 215° C. for 2 hours. After cooling to room temperature, the seal was broken and, under nitrogen, the temperature of the tube contents was raised to 260°–270° C. A slow stream of nitrogen was allowed to pass through the mixture and a vacuum of about 0.5 mm was maintained above it. When maximal viscosity was reached, the melt was cooled under nitrogen. A yield of 14 g of bright green fluorescent polymer was thereby obtained. On extrusion of this polymer beautiful, intensely fluorescent fibers were obtained. Attempts to leach the fluorescent material by dissolution in formic acid and precipitation with excess aqueous base did not affect the fluorescense.

EXAMPLE 4

A polymerization was carried using the procedure of Example 3 (except that 6 mg of 3,9-perylenedicarboxylic dichloride was utilized instead of the N,N'-bis(6-amino-1-hexyl)-3,9-perylenedicarboxamide.) The polymer resulting was similar in chemical, physical and optical properties to that obtained in Example 3.

EXAMPLE 5

A series of solution polymerizations was carried out utilizing a variety of diamines, conventional dicarboxylic acid chlorides, polynuclear aromatic dicarboxylic acid chlorides and mol ratios of polynuclear aromatic dicarboxylic acid to conventional dicarboxylic acid. In all runs the reaction solvent was chloroform, the reaction time was 3 hours at reflux (temperature about 63°C.) and 100 g of conventional dicarboxylic acid chloride was utilized. The quantities of polynuclear aromatic dicarboxylic acid chloride were ioned to provide the appropriate mole ratio. The amount of diamine utilized was the molar equivalent of the conventional dicarboxylic acid plus polynuclear aromatic dicarboxylic acid present. In all cases excess triethylamine was used to neutralize the evolved HCl. Reaction was effected simply by dissolving conventional dicarboxylic acid chloride, polynuclear aromatic dicarboxylic acid chloride, diamine and triethyl amine in chloroform refluxing for 3 hours, cooling to room temperature, filtering off the precipitated triethylamine hydrochloride and then stripping off excess triethyl amine and chloroform. The residue was washed with water and then extruded as a 20 denier monofilament fiber. In all cases the monofilament fiber was fluorescent.

It should be noted that concentrations of polynuclear aromatic dibasic acid in excess of 1 mole percent based on the conventional diacid are perfectly operable to produce fluorescent nylons. However, concentrations in excess of 1 mole percent do not produce a significantly greater fluorescent effect and because of the comparatively high cost of polynuclear aromatic dibasic acids, concentrations in excess of 1 mole percent result in a substantial increase in the cost of the nylon.

| Run | Diamine | Conventional diacid | Polynuclear aromatic diacid | Moles polynuclear aromatic diacid per 10,000 moles conventional diacid |
|---|---|---|---|---|
| 1 | Hexamethylenediamine | Adipic | Anthracene 1,5-dicarboxylic | 0.1 |
| 2 | do | do | do | 1 |
| 3 | do | do | do | 10 |
| 4 | do | do | do | 100 |
| 5 | do | do | Anthracene 1,8-dicarboxylic | 10 |
| 6 | do | do | Perylene 3,9-dicarboxylic | 10 |
| 7 | do | do | Perylene 3,10-dicarboxylic | 10 |
| 8 | do | do | 1:2,3:4 dibenzylanthracene-9,10-dicarboxylic | 10 |
| 9 | Ethylene diamine | do | Anthracene 1,5-dicarboxylic | 10 |
| 10 | Dodecamethylene diamine | do | do | 1 |
| 11 | p-Phenylene diamine | Terephthalic | do | 1 |
| 12 | Hydrogenated methylene dianiline | do | do | 1 |
| 13 | Tetramethylene diamine | Sebacic | do | 1 |
| 14 | do | 1,4 naphthalene dicarboxylic | do | 1 |
| 15 | do | 1,4-cyclohexane dicarboxylic | do | 10 |
| 16 | 1,4-diaminocyclohexane | do | do | 1 |

I claim:

1. A synthetic, linear, fiber-forming polycarbonamide wherein 0.001 to 1 percent of the recurring carbonamide units have the structure:

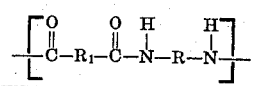

wherein R is a member selected from the group consisting of polymethylenes of 2 to 12 carbons, $C_2$ to $C_{24}$ alicyclic hydrocarbons, phenylene, and p,p'diphenyl methane and wherein $R_1$ is a fused ring polynuclear aromatic hydrocarbon moiety having at least three fused rings.

2. A polyamide in accordance with claim 1 wherein said fused ring polynuclear aromatic hydrocarbon is selected from the group consisting of anthracene, perylene and 1:2, 3:4 dibenzathracene.

3. A polyamide in accordance with claim 1 wherein said R is a $C_2$ to $C_{12}$ polymethylene.

4. A polyamide in accordance with claim 3 wherein said R is hexamethylene.

* * * * *